(12) United States Patent
Verbin

(10) Patent No.: US 6,885,699 B2
(45) Date of Patent: Apr. 26, 2005

(54) SEMI-STATIONARY QUIESCENT MODE TRANSMISSION

(75) Inventor: Rami Verbin, Tel Aviv (IL)

(73) Assignee: STMicroelectronics Ltd., Netanya (IL)

( * ) Notice: Subject to any disclaimer, the term of this patent is extended or adjusted under 35 U.S.C. 154(b) by 388 days.

(21) Appl. No.: 10/206,156

(22) Filed: Jul. 25, 2002

(65) Prior Publication Data

US 2003/0031269 A1 Feb. 13, 2003

Related U.S. Application Data

(63) Continuation-in-part of application No. PCT/IL01/00292, filed on Mar. 28, 2001.
(60) Provisional application No. 60/308,802, filed on Jul. 26, 2001, and provisional application No. 60/220,334, filed on Jul. 24, 2000.

(51) Int. Cl.[7] .................................................. H04B 1/38
(52) U.S. Cl. ........................ 375/222; 370/450; 370/459
(58) Field of Search .......................... 375/222; 370/231, 370/236, 450, 459; 379/93.06, 93.05, 229

(56) References Cited

U.S. PATENT DOCUMENTS

| | | |
|---|---|---|
| 5,249,200 A | 9/1993 | Chen et al. |
| 5,293,402 A | 3/1994 | Crespo et al. |
| 5,488,633 A | 1/1996 | Laroia |
| 5,602,602 A | 2/1997 | Hulyalkar |
| 5,878,086 A | 3/1999 | Hulyakar |
| 5,881,108 A | 3/1999 | Herzberg et al. |
| 5,881,363 A | 3/1999 | Ghosh et al. |
| 6,031,826 A | 2/2000 | Hassan |
| 6,052,411 A | 4/2000 | Mueller et al. |
| 6,167,082 A | 12/2000 | Ling et al. |
| 6,201,830 B1 | 3/2001 | Chellali et al. |
| 6,411,657 B1 | 6/2002 | Verbin et al. |
| 6,519,280 B1 * | 2/2003 | Cole .......................... 375/222 |
| 6,560,197 B1 * | 5/2003 | LeVieux et al. ............ 370/231 |

FOREIGN PATENT DOCUMENTS

| | | |
|---|---|---|
| WO | 98/12824 | 3/1998 |
| WO | 98/36493 | 8/1998 |
| WO | 98/39372 | 9/1998 |
| WO | 98/48545 | 10/1998 |
| WO | 98/55522 | 12/1998 |
| WO | 00/31939 | 6/2000 |
| WO | 01/76118 | 10/2001 |

OTHER PUBLICATIONS

Gitlin et al., "Data Communications Principles", Plenum Press, New York, 1992, pp. 334–347, 500–513, 585–590.
Wei, "Generalized Square and Hexagonal–Constellations for Intersymbol Interference Channels with Generalized Tomlinson–Harashima Precoders", IEEE Transactions on Communications, 42:9 (Sep. 1994), pp. 2713–2721.
Crespo, "Pole–Zero Decision Feedback Analyzer with a Rapidly Converging Adaptive IIR Algorithm", IEEE Journal on Selected Areas in Communications, 9(6), Aug. 1991, pp. 817–828.
Haykin, "Adaptive Filter Theory", 3rd Edition, Prentice–Hall, 1996, pp. 365–572.

(Continued)

Primary Examiner—Amanda T. Le
(74) Attorney, Agent, or Firm—Darby & Darby

(57) ABSTRACT

A method for transmission of high-speed digital signals includes transmitting a data signal over a communication line responsive to input data, the data signal having a data frequency spectrum. During an idle interval in the input data, two idle signals are transmitted in alternation: a first idle signal, having a first frequency spectrum that is substantially stationary relative to the data frequency spectrum, and a second idle signal, having a second frequency spectrum that is substantially non-stationary relative to the data frequency spectrum.

34 Claims, 3 Drawing Sheets

OTHER PUBLICATIONS

"The Business Case for VDSL: A White Paper", Orckit Communications, Apr. 1999, pp. 1–16.

"Effects of Pulsating Crosstalk on Vintage ADSL Modems", described in contribution D.832 to the ITU, by Alcatel.

Ciolffi, J., (T1E1.4 VDSL Editor), "Very–high–speed Digital Subscriber Lines System Requirements", T1E1.4/98–043R6, Plano, Texas, Nov. 1998, pp. 1–2.

Foster, K., et al., "Transmission and MultiplexingTM"; Access Transmission Systems on Metallic access cables; Very high speed Digital Subscriber Line (VDSL), Sec. 9.3, TS 101 270–1 V1.1.5, 1999, p. 36.

http://www.orckit.com, "What is VDSL?" Orckit Communications–DSL FAQ3, Nov. 1999, p. 1.

http://www.orckit.com/qam.html, DSL Knowledge Center–QAM: the Choice for VDSL Transmission Line Code, by Ehud Rokach, 1998, pp. 1–2.

* cited by examiner

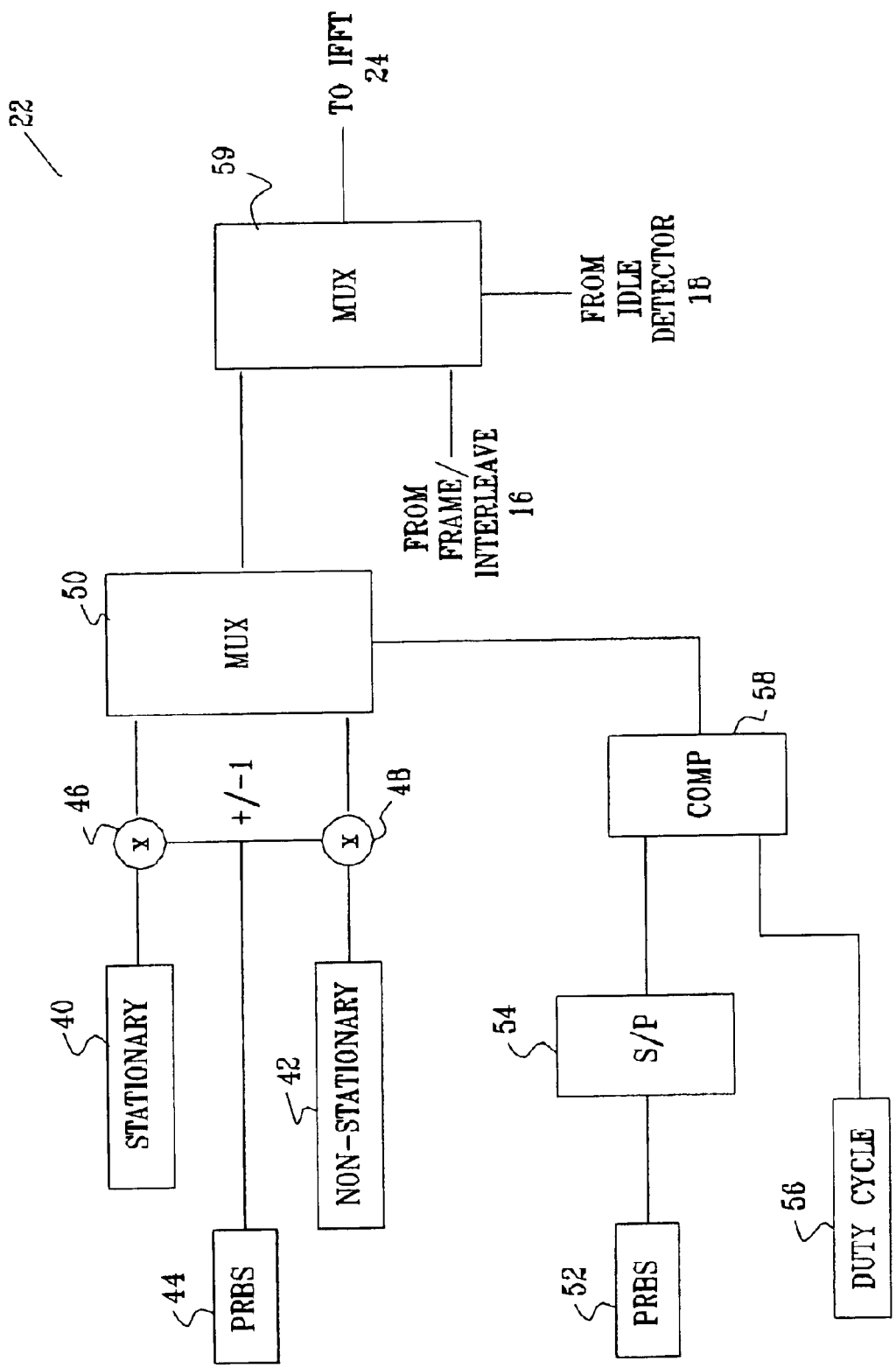

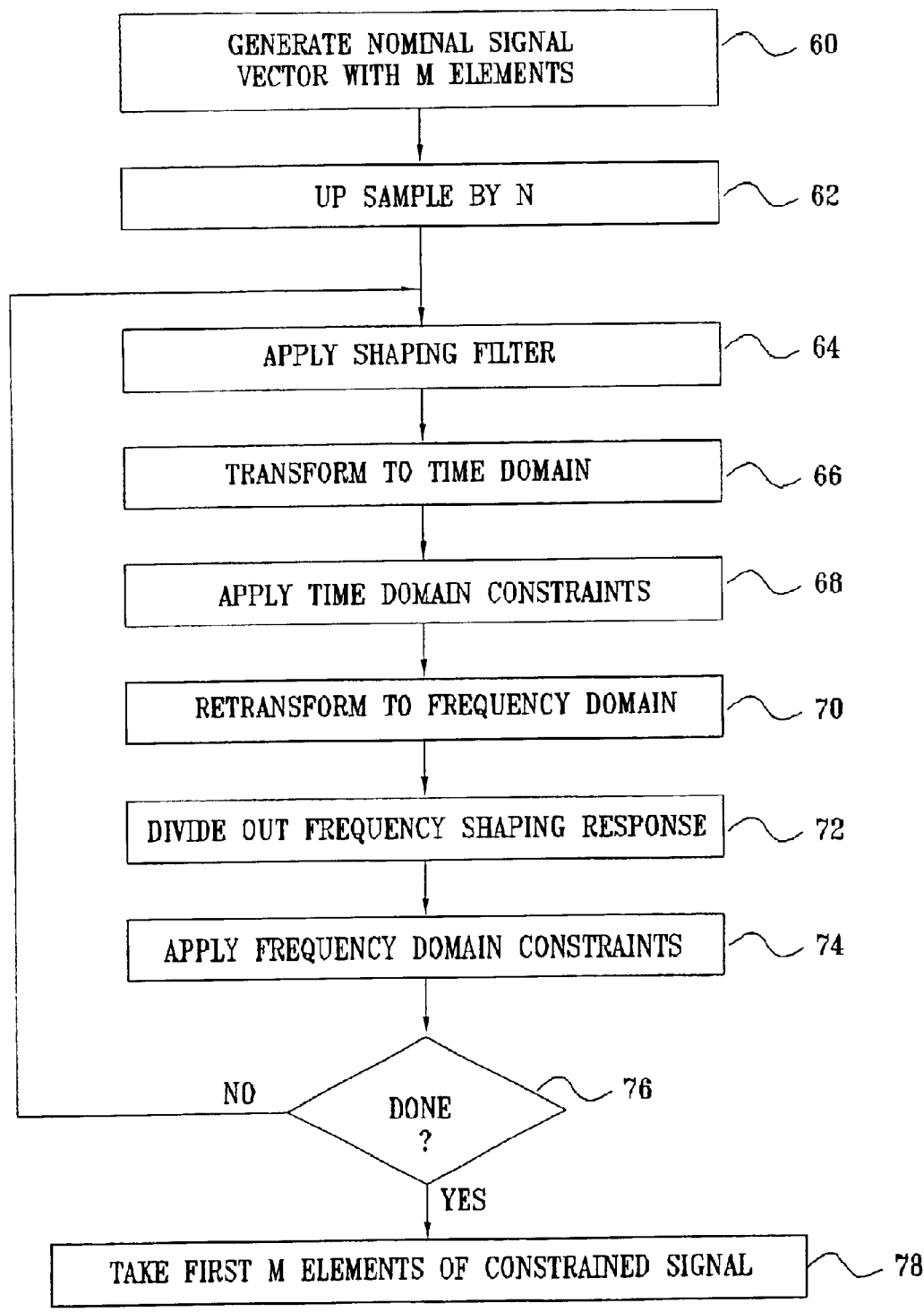

SEMI-STATIONARY QUIESCENT MODE TRANSMISSION

CROSS-REFERENCE TO RELATED APPLICATION

This application claims the benefit of U.S. Provisional Patent Application 60/308,802, filed Jul. 26, 2001. It is a continuation-in-part of co-pending PCT Patent Application PCT/IL01/00292, which claims the benefit of U.S. Provisional Patent Application 60/220,334, filed Jul. 24, 2000. All these related applications are incorporated herein by reference.

FIELD OF THE INVENTION

The present invention relates generally to high speed data transmission, and specifically to methods and devices for reducing power consumption during idle periods in data transmission.

BACKGROUND OF THE INVENTION

Power consumption is a crucial factor in the deployment of Digital Subscriber Line (DSL) modems. As technology evolves, the power consumption of the digital part of the modem can be reduced significantly by using new processes, such as moving from 0.5 $\mu$m semiconductor devices to 0.25 $\mu$m and 0.18 $\mu$m devices. In contrast to the digital part, the power consumption of the analog part of the modem remains largely unchanged, and thus becomes the most significant factor in overall power consumption.

One approach to reducing the power consumption takes advantage of the large periods of time in which the transmission includes only idle information, such as ATM idle cells. This approach defines a quiescent mode, or Q-mode, which the modem transmitter enters during these idle periods. Possible characteristics for Q-mode operation have been proposed in contributions to the International Telecommunications Union (ITU), such as contribution D.282, by 3Com Corporation, and contribution D.415, by Alcatel. These contributions are incorporated herein by reference.

Q-mode proposals to date have focused on discrete multi-tone (DMT) transmission methods, which are used in Asymmetric DSL (ADSL). These proposals are based mainly on limiting transmission during idle periods to a single tone, preferably the pilot tone that is normally used for frequency tracking. The advantages of the pilot tone method include:
Very low power consumption—transmitting only about 1/256 of the total nominal power of the transmitter.
Continuous frequency tracking, so that the transmitter and receiver remain locked to the proper frequency.
Very simple to implement in the transmitter.
Easy to detect at the receiving end.

This solution suffers from a significant problem, however: it creates a non-stationary noise environment for neighboring modems. The spectral profile of crosstalk noise received by other modems (known as far end crosstalk—FEXT—and near end crosstalk—NEXT) is not constant in time. The noise is low during Q-mode operation, because only one carrier is transmitted, but it increases sharply when the modem returns to its normal transmit mode, in which most of the 256 ADSL carriers are used. The sensitivity of ADSL receivers to non-stationary cross talk varies with frequency and with the type of interference (NEXT or FEXT), as described in contribution D.832 to the ITU, by Alcatel, entitled "Effects of Pulsating Crosstalk on Vintage ADSL modems," which is incorporated herein by reference.

The result of this non-stationary behavior is performance degradation. The ADSL receiver tracks the noise and attempts to adapt to its particular characteristics so as to maximize the noise margin or the data rate. The modem cannot track the sharp changes in the noise floor due to Q-mode transitions, however, and the result is a long burst of errors upon every transition. This error burst may be severe enough to cause the modem to "retrain" for the altered noise conditions. Such retraining is undesirable, because it interrupts modem service for several seconds. Proposed techniques for dealing with non-stationary crosstalk due to Q-mode transitions are described in contributions TD22 and TD26 to Standards Committee TM6 of the European Telecommunications Standards Institute (ETSI), submitted by Alcatel. These contributions are incorporated herein by reference. Implementation of these proposed techniques would require modification and/or reprogramming of currently-deployed modems.

Another approach for reducing transmitter power consumption is to dynamically switch the power supply voltage of the transmitter between two levels. This method does not require any special signal for Q-mode, and actually does not require a Q-mode at all. It is applied to the transmitted signal while the modem operates in its normal data mode. The disadvantage of this method is that it requires very rapid switching of the power supply, typically within less than 2 $\mu$sec switching time. Such fast switching is likely to degrade the linearity of the transmitter's line driver. For this reason, the idea of voltage switching has not been adopted in any practical modem. Contribution D.835 to the ITU, by Alcatel, notes that power consumption of an ADSL transmitter can be reduced by static reduction of the line driver supply voltage and bias current. The contribution indicates that there is a need for dynamic power saving methods. It concludes, however, that further study of the degrading effects of non-stationary crosstalk is required in order to define an optimal dynamic power saving technique.

SUMMARY OF THE INVENTION

It is an object of some aspects of the present invention to provide an improved method for reducing power consumption of a transmitter during idle periods and to provide transmitters that implement the method.

The above-mentioned PCT Patent Application PCT/IL01/00292 describes methods and devices for generating Q-mode signals that have a low peak-to-average ratio (PAR), while maintaining a stationary noise environment relative to normal, "showtime" transmission. The PCT application describes a high-speed data transmitter, which transmits data signals over a communication line to a receiver, with a characteristic frequency spectrum and PAR, based on a stream of input data. When there is an idle interval in the input data, such as a period of silence or idle cells, indicating that there is no information to transmit, the transmitter generates an idle signal, also referred to as a Q-mode signal. The Q-mode signal is based on a sequence of data values, which is selected so as to give a frequency spectrum that is similar to that of the data signals, while its PAR is substantially lower than the data signal PAR.

In one embodiment described in the PCT application, the transmitter in Q-mode transmits two signals in alternation: a "stationary" signal with low PAR, and a "non-stationary" signal with low overall power, such as a pilot tone. The stationary signal preferably has the same power spectral density (PSD) mask as do ADSL showtime signals—typically a flat frequency spectrum covering the normal transmission range. Power consumption is reduced by alternating between this signal and the low-power non-stationary signal.

Preferred embodiments of the present invention take the idea of alternating stationary and non-stationary Q-mode signals a step further. In these preferred embodiments, the stationary signal may be any signal that has similar spectral characteristics to the normal (showtime) signal. Preferably, the stationary signal is chosen to have substantially the same statistical characteristics as normal transmission, rather than compromising the statistical characteristics of the Q-mode signal in favor of low PAR. The non-stationary signal is preferably a low-power, narrow-band signal, such as a pilot tone.

While operating in Q-mode, the transmitter preferably transmits the stationary and non-stationary idle signals in random or periodic alternation, with a predefined duty cycle ratio between the two signals. This ratio determines the overall stationarity of the transmitted signal. When the communication system in which the transmitter operates must meet strict stationarity requirements, the stationary signal is transmitted most of the time while the transmitter is idle. On the other hand, when system requirements allow non-stationarity, power savings can be achieved by increasing the relative duty cycle of the non-stationary, low-power signal. Both the stationary and non-stationary Q-mode signals can be generated very easily, without the need for channel-dependent optimization. Furthermore, because the stationary Q-mode signal has the same statistical and spectral characteristics as does normal, data-conveying transmission, the receiver can track the stationary signal during idle periods, and will then be able to start receiving data seamlessly when normal transmission resumes, without the need for re-adaptation or retraining.

Although preferred embodiments are described herein mainly with reference to ADSL modems and standards, the principles of the present invention may similarly be applied to other DSL systems, such as Very High Rate DSL (VDSL), as well as to high-speed data transmission systems of other types.

There is therefore provided, in accordance with a preferred embodiment of the present invention, a method for transmission of high-speed digital signals, including:

transmitting a data signal over a communication line responsive to input data, the data signal having a data frequency spectrum; and during an idle interval in the input data, transmitting in alternation a first idle signal, having a first frequency spectrum that is substantially stationary relative to the data frequency spectrum, and a second idle signal, having a second frequency spectrum that is substantially non-stationary relative to the data frequency spectrum.

Preferably, transmitting the first and second idle signals includes controlling the alternation so that a combined spectrum of the signals transmitted during the idle interval is non-stationary relative to the data frequency spectrum to within an allowed limit of non-stationarity.

Additionally or alternatively, the second idle signal is chosen so as to have a substantially lower power consumption characteristic than the first idle signal. Typically, the data and idle signals include multiple tones, and the second idle signal includes a substantially reduced number of tones relative to the first idle signal. Preferably, the second idle signal consists of a pilot tone, while the first idle signal consists of substantially the same tones as the data signal. Preferably, the power characteristic includes a peak-to-average ratio (PAR).

Further preferably, the first idle signal is chosen to have statistical characteristics substantially similar to the statistical characteristics of the data signal. Most preferably, the statistical characteristics and spectral characteristics of the first idle signal are substantially indistinguishable to a receiver of the idle and data signals from the statistical characteristics and spectral characteristics of the data signal. Additionally or alternatively, the first idle signal includes a random signal.

Preferably, transmitting the idle signals includes setting a duty cycle for alternation between the first and second idle signals, and transmitting the signals in accordance with the set duty cycle. Most preferably, setting the duty cycle includes controlling the duty cycle so that a combined spectrum of the signals transmitted during the idle interval has a selected degree of non-stationary relative to the data frequency spectrum. Alternatively, setting the duty cycle includes controlling the duty cycle so that the signals transmitted during the idle interval, taken together, have a selected level of average power.

In a preferred embodiment, transmitting the idle signals includes intermittently altering a phase of at least one of the first and second idle signals, whereby a spectrum of the signals is flattened, and a bias on at least certain tones of the idle signals is eliminated. Preferably, intermittently altering the phase includes shifting the phase at random by multiples of 90 degrees.

In a further embodiment, the first and second idle signals are respectively based on first and second nominal sequences of varying complex values, wherein the first and second nominal sequences are substantially identical.

There is also provided, in accordance with a preferred embodiment of the present invention, apparatus for transmission of high-speed digital signals, including:

a data encoder, which is adapted to receive input data and to generate a stream of data symbols responsive to the input data and further to generate in alternation, during an idle interval in the input data, first and second sequences of idle symbols;

a shaping filter, coupled to receive the stream of data symbols from the signal generator and to generate, responsive thereto, a data signal having a data frequency spectrum, and to receive the first and second sequences of idle symbols and to generate, responsive respectively thereto, a first idle signal, having a first frequency spectrum that is substantially stationary relative to the data frequency spectrum, and a second idle signal, having a second frequency spectrum that is substantially non-stationary relative to the data frequency spectrum; and a line driver, coupled to receive the data signal and the idle signals from the shaping filter and to transmit the signals over a line to a receiver.

The present invention will be more fully understood from the following detailed description of the preferred embodiments thereof, taken together with the drawings in which:

BRIEF DESCRIPTION OF THE DRAWINGS

FIG. 2 is a block diagram that schematically illustrates a data encoder for generating an idle mode signal, in accordance with a preferred embodiment of the present invention; and FIG. 3 is a flow chart that schematically illustrates a method for generating an idle mode signal, in accordance with a preferred embodiment of the present invention.

DETAILED DESCRIPTION OF PREFERRED EMBODIMENTS

Figure 1:
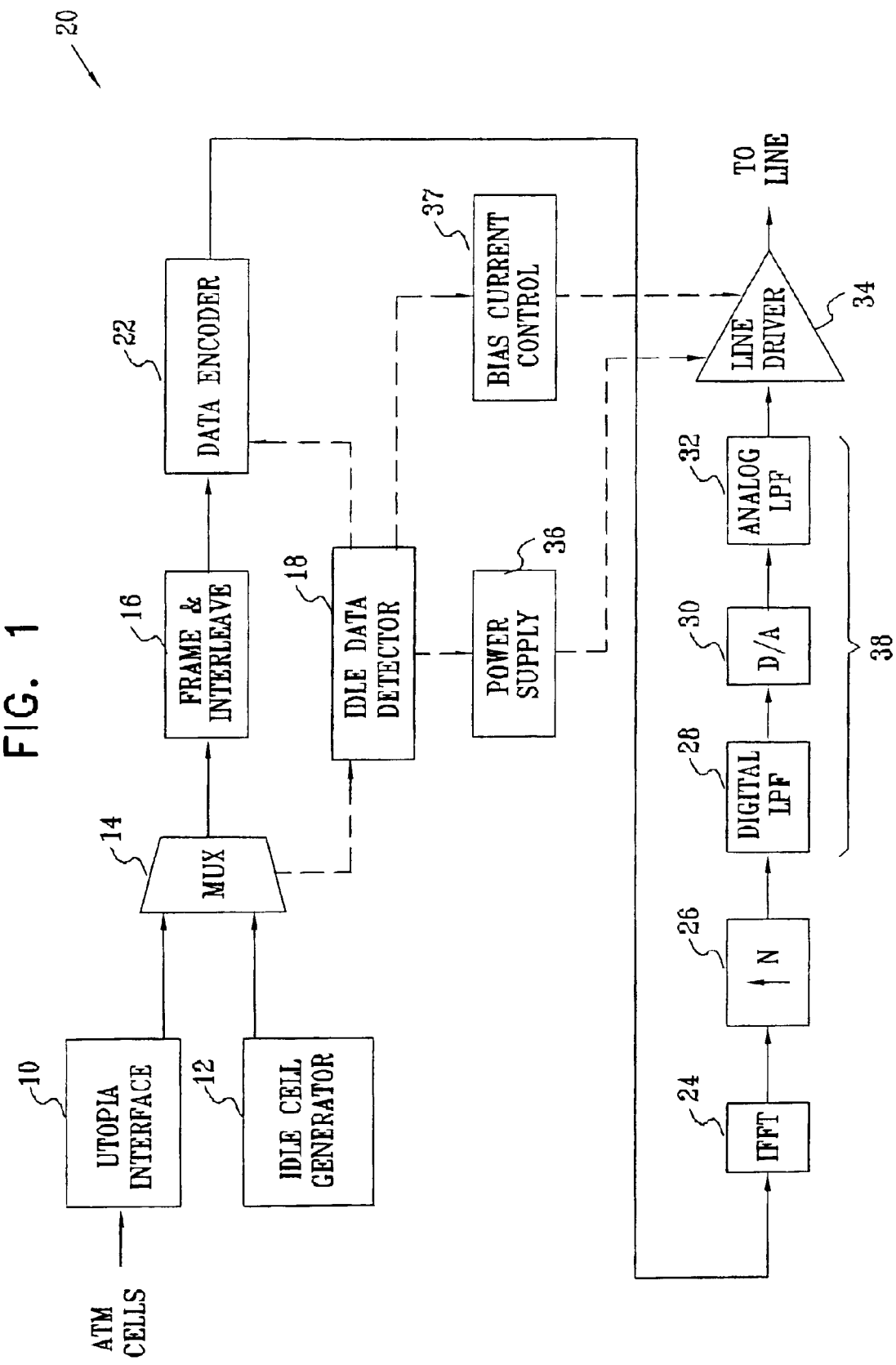
FIG. 1 is a block diagram that schematically illustrates a data transmitter, in accordance with a preferred embodiment of the present invention.

FIG. 1 is a block diagram that schematically illustrates elements of a high-speed data transmitter 20, in accordance with a preferred embodiment of the present invention. The design of transmitter 20 is appropriate for use in an ADSL modem, and the following preferred embodiment will be described with reference to ADSL standards and signals. It will be understood, however, that the devices and methods described hereinbelow may also be used, mutatis mutandis, in other data transmission systems and in accordance with other standards. While a particular, simplified block design of transmitter 20 is shown in FIG. 1 for the sake of illustration, other designs that implement the principles of the present invention will be apparent to those skilled in the art. It will also be understood that although different functions are represented in FIG. 1 by different blocks, in practical applications a number of these functions may be carried out by a single integrated circuit device.

Transmitter 20 comprises a data interface, preferably a UTOPIA interface 10, which receives ATM cells for transmission over a communication line. An idle cell generator 12 generates ATM idle cells, which are selected by a multiplexer 14 when there are no information-bearing cells at interface 10. A framing and interleaving block 16 creates a data frame for transmission, which is then fed to an encoder 22. The encoder encodes the data from the framer 22 into a stream of output symbols, typically DMT symbols as specified by ADSL standards. Each such symbol has the form of a vector with up to 256 complex values in the frequency domain, defined by quadrature amplitude modulation (QAM).

An idle data detector 18 determines when the input data stream is idle, i.e., when the symbols generated by block 14 or 16 contain no meaningful information. Under these conditions, detector 18 causes transmitter 20 to enter an idle mode, also referred to herein as a quiescent mode, or Q-mode. In this mode, detector 18 signals a data encoder 22 to replace the symbols from block 16 with predefined idle mode symbols, as defined hereinbelow.

The symbols output by encoder 22 are transformed into a stream of time-domain samples by an inverse Fast Fourier Transform (IFFT) machine 24, as is known in the art. An interpolator 26 upsamples the stream by a factor N, wherein typically N=4, by adding zeroes between the actual samples. A digital low-pass filter (LPF) 28 is used to filter images created by interpolator 26. A digital to analog (D/A) converter 30 converts the samples to analog form, following which an analog LPF 32 is used to eliminate high-frequency artifacts, particularly images, remaining after the digital filtering. LPF 28, D/A converter 30 and analog LPF 32 can together be characterized by their collective frequency response, and are considered hereinbelow as an equivalent spectral shaping filter 38, which is applied to the signals that are output by transmitter 20.

The output signals from filter 38 are fed to a line driver 34, which sends the signals over a line to a receiver (not shown). A power supply 36 provides DC power to the line driver. The power consumption of the line driver depends, inter alia, on the PAR, or crest factor. The PAR is defined as the ratio in dB between the peak level of the output signal and the RMS level. The dependence of the line driver dynamic (AC) power consumption on the PAR in dB is given roughly by the following formula:

$$\text{Power consumption (dBm)} \sim \text{PAR}/2 + \text{transmitted power (dBm)}$$

Since the PAR for ADSL signals is high, typically in the range of 15–17 dB, the contribution of PAR to power consumption is substantial. When the PAR of the output signals is reduced in an idle or quiescent mode (Q-mode) of transmitter 20, as described hereinbelow, the power required from supply 36 can be reduced accordingly.

When transmitter 20 enters the idle mode, idle data detector 18 causes the power consumption by the transmitter to be reduced by switching the voltage provided to line driver 34 by supply 36. Preferably, detector 18 also switches a bias current controller 37 to decrease the DC bias current to line driver 34 to be decreased, as well, thus further saving on power consumption. Decreasing the DC current tends to increase signal distortion introduced by line driver 34. While the transmitter is operating in Q-mode, however, the distortion is of secondary importance, so that the current supplied to line driver 34 may typically be decreased without significant performance degradation.

To clarify this point, it is noted that typically distortions increase with frequency. In ADSL, upstream transmissions from subscribers to the central office generally use lower frequencies, which are less sensitive to distortion, while downstream transmissions from the central office use the higher frequencies. Therefore, decreasing the bias current typically affects the downstream transmission frequencies more than the upstream frequencies. Some distortion of downstream Q-mode signals transmitted from the central office (where reducing power consumption is of most serious concern) can be permitted, since the signals contain substantially no data other than the pilot tone and the nominal signal itself. The distorting effect of the bias current reduction is less significant in the lower-frequency band, which may still convey upstream information while the transmitter is in idle mode.

As noted above, when transmitter 20 enters the idle mode (or Q-mode), encoder 22 outputs a Q-mode signal. This signal comprises a periodic signal based on a selected nominal signal, preferably an ADSL Reverb signal, as defined in the G.dmt standard, or a sequence of such periodic signals with different phase shifts, as described hereinbelow. The nominal signal is defined as a pseudo-random complex sequence in the frequency domain, having the form of a vector of 257 complex values, preferably 4QAM values. (4QAM values, also known as quadrature phase shift keying, or QPSK, values, can be expressed as ±1±j.) Alternatively, other nominal signals may be used instead of the Reverb.

The nominal signal is chosen so as to afford certain desirable characteristics at the line driver input. These characteristics typically include the desired spectrum (PSD) and statistical behavior, such as low PAR. The nominal signal preferably has roughly the same PSD mask as do normal ADSL signals, typically a generally flat frequency spectrum covering the same frequency range as that of the normal ADSL data signals. These characteristics are preferably achieved while using 4QAM constellation points.

The Reverb signal meets these requirements. As a result, the NEXT and FEXT noise generated due to Q-mode operation of the transmitter will be stationary relative to the noise generated in normal operation, and the PAR in Q-mode will be relatively low. Alternatively, other 4QAM signals that are better fitted to specific transmit path and line driver characteristics may be used. The nominal signal in such a case can be defined by the transmitter and communicated to the receiver.

The Q-mode frequency vector is translated by IFFT machine 24 into a time sequence of 512 samples, corresponding to one ADSL symbol. In the simplest implementation, the Q-mode vector is identical to the standard Reverb vector. This signal has a low PAR, approximately 8.5 dB after interpolation and shaping. Further reduction in the PAR can be achieved, however, by additional adjustments of the complex amplitudes of the vector elements. The adjustments are subject to a number of constraints:

- The PSD of the resultant output Q-mode signal should be close to the PSD of the Reverb signal, to within a predefined tolerance. Preferably, the PSD of the Q-mode signal should be within ±3 dB of either the nominal PSD or of the actual transmitted PSD of the transmitter in normal (data transmission) mode, in accordance with the actual fine gain settings used in the transmitter.
- The original phases of the carriers in the Reverb signal should also be maintained to within a predefined tolerance. Preferably, the phase deviation of the carriers should be such that the Q-mode signal will be easily detected by the receiver as a Reverb signal, as though the receiver were receiving an actual Reverb signal with a signal/noise ratio of 15–25 dB.
- There should be no bias in the pilot tone in the Q-mode signal. ADSL modems normally use carrier 64 for frequency tracking, but the Q-mode signal may include one or more alternative or additional carriers for frequency tracking.
- The PAR of the Q-mode signal should be as low as possible, preferably less than 7 dB, and most preferably about 5 to 6 dB.

As long as these constraints are observed, the adjustments in the Q-mode signal will remain transparent to the receiver, while allowing the signal to be optimized for the specific characteristics of the digital and analog front-end components of transmitter 20. It is not necessary that all of the 256 ADSL carriers be used in the Q-mode signal. Rather, the number of Q-mode carriers should be equal or close to the number of carriers actually used in normal operation of transmitter 20. The "adjusted" Reverb signal is preferably optimized to use the same carriers that are used in normal operation. Alternatively, in some cases only a subset of the available carriers may be used. In particular, if the crosstalk level on some carriers is very low, then these carriers are preferably eliminated from the Q-mode signal. Preferably, the pilot tone is always included among the Q-mode carriers.

In addition to the above-mentioned variations in the complex values of the Reverb sequence, the power of the Q-mode signal itself may also be decreased. It is not desirable to decrease the total power too much, due to the requirement that the noise spectrum remain stationary. Some room for reduction does exist, however, since practical modems normally work with an extra margin of signal/noise ratio. This margin may be slightly decreased if a small non-stationarity is allowed.

Although the above description relates particularly to a case in which Reverb is chosen as the nominal signal is Reverb, the principles of the description are applicable to substantially any suitable nominal sequence. It is expected that if the nominal sequence is optimized for the specific transmit path in use, a smaller tolerance in the phase and amplitude of the nominal signal will yield the same PAR as the adjusted Reverb signal. Alternatively, lower PAR will be achieved with the same tolerance for distortion of the nominal signal.

FIG. 2 is a block diagram that schematically illustrates details of encoder 22, in accordance with an alternative embodiment of the present invention. In this embodiment, additionally or alternatively to the above-mentioned decrease in power, the stationary Q-mode signal is switched alternately "on" and "off" with a selected duty cycle. During the "off" periods, only the pilot tone or a limited set of carriers is transmitted. Although this technique, like varying the power of the Q-mode signal, creates some non-stationarity, a limited amount of variation is always allowed. The permitted level of non-stationarity may change from region to region or from country to country based on various factors, such as penetration percentage of legacy systems (which tend to be more vulnerable to non-stationarity), available loop lengths, allowed PSD masks, and typical applications (i.e., data rates).

The duty cycle is preferably chosen based on the amount of variation allowed in the average signal PSD, compared to the nominal or actual transmission level. For example, if the allowed average variation in the transmitted PSD is 4 dB, one possible solution is to switch the Q-mode signal with a duty cycle of 50%, and to allow a peak (negative) variation from the nominal PSD of not more than 1 dB during the "on" periods. It is assumed in this example that only the pilot tone is transmitted during the "off" periods, although this is not a mandatory requirement. The pilot tone may be supplemented with additional carriers if needed in any frequency band in which no non-stationary behavior can be tolerated.

When using an on-off modulated Q-mode signal, the bias current and voltage to line driver 34 are preferably switched in time with the modulation, as described above in order to reduce the power consumption of the transmitter.

One preferred embodiment includes an "on-off" idle signal. The "on" signal is a low PAR signal like Reverb (for ADSL) designed to use some limited set of carriers according to the crosstalk characteristics (to eliminate non-stationarity) and the "off" signal is just the pilot tone. The duty cycle may be decreased if more carriers are used during the "off" periods. There is thus some tradeoff between the duty cycle of the "on-off" signal and the carriers used during the "off" period.

In a preferred embodiment (not illustrated in the figures), a controller monitors the performance of receivers in a neighborhood of transmitter 20. The controller adjusts the power and/or duty cycle of the Q-mode signal as necessary, and optionally other parameters as well, so as to reduce power consumption by the transmitter without causing frequent resetting of the receivers due to non-stationary noise.

Returning now to FIG. 2, the stationary idle signal generated by encoder 22 is output as required from a stationary signal memory 40. The non-stationary idle signal, comprising the pilot tone and possible additional tones, is output from a non-stationary signal memory 42. Preferably, both the stationary and non-stationary signals are based on 4QAM signals, possibly with some limited distortion. The stationary and non-stationary signals are preferably both based on the same nominal signal. Alternatively, the stationary and non-stationary signals may be based on two different nominal signals. Most preferably, both the stationary and non-stationary signals comprise the Reverb signal, as described above, but extend over different ranges of tones, which are defined in accordance with the operating environment and constraints of transmitter 20. In any case, the stationary and non-stationary signals are selected so as to optimize the signal at the line driver input. The carriers to be included in the stationary and non-stationary signals are preferably communicated from the transmitter to the receiver during a pre-startup phase of operation. The G.hs protocol, defined by ITU Recommendation G.994, may be used for this purpose.

Preferably, the phases of successive Q-mode symbols are varied, most preferably by reversing the signs of the complex elements in the Q-mode vector. (This phase reversal corresponds to using a signal similar to the ADSL "Segue" signal in place of the Reverb signal. The difference between this reversed signal and the Segue signal is that in the Segue signal, the pilot tone is not reversed.) The phase reversal is implemented by a pseudo-random bitstream (PRBS) generator 44, outputting values of ±1 to multipliers 46 and 48. Alternatively, two different PRBS devices independently multiply the stationary and non-stationary signals output by blocks 40 and 42. Most preferably, the phase reversal occurs with a period longer than 4000 symbols and is such as to give, over long time periods, an even distribution of positive and negative phases. Alternatively or additionally, 90° phase shifts may be applied in the frequency or time domain. The phase variation flattens the spectrum of the transmitted signal and prevents both the local receiver and neighboring receivers from detecting and locking onto a bias in the noise generated by transmitter 20.

The stationary and non-stationary Q-mode signals are selected by a multiplexer 50 in alternation, with an average duty cycle that is set in a duty cycle register 56. Preferably, the alternation between the stationary and non-stationary signals is also random, controlled by another pseudo-random bitstream generator 52, which drives a serial to parallel (S/P) block 54 to output random values corresponding to values between 0 and 100. A comparator 58 compares the output of S/P block 54 to the duty cycle value in register 56. When the value output by S/P block 54 is greater than the register value, the comparator drives multiplexer 50 to select the non-stationary signal, while the stationary signal is chosen when the output of S/P block 54 is lower than the register value. Thus, when the duty cycle register is set to 100, only the stationary signal is output, and when the register is set to 0, only the non-stationary signal is output.

Preferably, multiplexer 50 alternates between the stationary and non-stationary signals on a symbol-by-symbol basis, so that symbols (including their cyclic prefixes) are not cut off in the middle.

In an alternative embodiment, the stationary signal held in memory 40 is chosen to have substantially the same spectral and statistical properties as the normal, showtime data signal. In other words, the stationary signal is chosen not for low PAR, but rather to have the same PSD as the normal signal, covering the same spectral range. The stationary signal may be generated, for example, by processing random-generated bits in the same manner as as data from UTOPIA interface 10 are processed during normal transmission. In this case, it may not be necessary to store the stationary signal in memory 40. Alternatively, the stationary signal may comprise a normal signal modulated by idle cells, overhead, or non-data bits.

Typically, although not necessarily, the low-power, non-stationary signal in the present embodiment comprises a pilot tone. Alternatively, the pilot tone may be supplemented with other carriers in any frequency bands in which non-stationary behavior cannot be tolerated. Aside from the different choice of stationary and, possibly, non-stationary signals, however, encoder 22 may operate in substantially the same way as described above.

Using these alternative choices of stationary and non-stationary Q-mode signals, a duty cycle value of 50% in register 56 will give an average variation of 3 dB in the transmitted PSD. In environments that are indifferent to non-stationary crosstalk, transmitter power consumption can be minimized by setting the duty cycle to zero. On the other hand, in sensitive environments, the duty cycle can be increased to meet even the most stringent stationarity requirements.

When the stationary Q-mode signal has the same statistical and spectral characteristics as does normal, data-conveying transmission, the receiver (not shown) can track the stationary signal easily during idle periods. The receiver will then be able to start receiving data seamlessly when normal transmission resumes, without the need for re-adaptation or retraining. Preferably, in order for the receiver to determine reliably when actual data transmission is about to resume following an idle period, transmitter 20 sends an agreed sync or other start signal before beginning to transmit data. Similarly, there may be an agreed signal to indicate when an idle interval is about to begin.

Regardless of the choice of Q-mode signals, as long as idle data detector 18 determines that transmitter 20 is receiving actual data from interface 10, a final multiplexer 59 in encoder 22 selects the actual data passed by framing and interleaving block 16 as input to IFFT block 24. On the other hand, when the idle data detector determines that block 16 is passing idle cells, it triggers multiplexer 59 to convey the Q-mode signal from multiplexer 50 to the IFFT block.

FIG. 3 is a flow chart that schematically illustrates a method for generating an optimized Q-mode signal, based on a nominal signal such as the Reverb signal, in accordance with a preferred embodiment of the present invention. This method is preferably carried out during a startup phase of transmitter 20, when the utilization of the carriers in normal operation is known. An off-line calculation is also possible, but without adaptation to the actual utilization of carriers, less significant PAR reduction is expected.

In order to optimize the Q-mode signal, the method starts with a nominal signal, such as the Reverb signal, on which the Q-mode signal is to be based. Alternatively, the nominal signal can be selected to be an arbitrary 4QAM signal with constellation points that optimize the expected signal at the line driver input. The result of using such a signal is that lower PAR will be available for a given allowed distortion in the nominal signal. In any case, the nominal signal is created at a generation step 60, in the form of a complex frequency-domain vector with M elements. The value of M corresponds to the Nyquist frequency of the nominal signal. Thus, for ADSL there are M=257 carriers, spanning the range from 0 to 1.104 MHz. Alternatively, the nominal signal may be created directly in the time domain, preferably in the form assumed by the signal following interpolator 26.

At an upsampling step 62, the nominal signal or sequence is interpolated by a factor N, typically N=4. The interpolation in the time domain corresponds to adding zeroes between the actual samples in the signal, without low-pass filtering at this stage. In the frequency domain, the interpolation expands one side spectrum of the signal to N*M carriers, or to N*1.104 MHz in the case of ADSL. At a shaping step 64, the filter response of shaping filter 38, corresponding to digital LPF 28, D/A converter 30 and analog LPF 32, is applied to the upsampled signal. The resultant shaped signal is transformed to the time domain, as a transformation step 66, preferably using an IFFT operation.

At this point the signal corresponds simply to the nominal signal, following interpolation and spectral shaping. At a time-domain processing step 68, predefined time-domain constraints are applied to the signal. Preferably, these constraints include limiting the amplitudes of any peaks in the time-domain signal, so as to bring the PAR of the signal to within a predefined maximum.

The constrained time-domain signal is retransformed to the frequency domain, preferably using a FFT, at a retransformation step 70. The equivalent effect of spectral shaping filter 38 is then divided out of the frequency domain signal, at a filter division step 72. This step is equivalent to finding the signal at the output of interpolator 26 that, after filtering by filter 38, would give the constrained signal found at step 70. At a frequency-domain processing step 74, frequency-domain constraints are applied to this signal. Typically, applying these constraints involves manipulating the complex amplitudes of the vector elements, including operations such as:

Setting the phase of the pilot tone to a required value, so as to eliminate pilot tone bias.

Restoring Hermitian symmetry to the signal spectrum, preferably by setting the amplitudes of the out-of-band spectral components (in the range of tones 258–511) to be the complex conjugates of the corresponding passband components (0–255).

Limiting the amplitudes and phases of the vector elements to within some allowed tolerance of the nominal 4QAM values. Typical tolerances are approximately +/−3 db for amplitude and peak phase deviation of approximately 15 degrees.

Eliminating the use of carries which are not required for the Q-mode signal or are not used in normal operation of the transmitter.

At a completion step 76, the vector generated at step 74 is examined to determine whether it has converged so that the PAR of the resultant Q-mode signal will be below a desired limit. Other signal characteristics may also be considered. If the vector does not meet the convergence criteria, steps 64 through 76 are repeated using this constrained vector as an input. If convergence has been achieved, or if the process has already looped through steps 64 through 76 a predetermined number of times without converging, then the process is terminated. Of the total N*M elements in the constrained vector, only the first M complex elements are saved, and the rest are discarded. In the case of ADSL, there are 256 such elements (since carrier 257 is always zero), which subsequently define the output from signal generator 22 to IFFT machine 24 when transmitter 20 enters Q-mode operation.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for transmission of high-speed digital signals, comprising:

transmitting a data signal over a communication line responsive to input data, the data signal having a data frequency spectrum; and during an idle interval in the input data, transmitting in alternation a first idle signal, having a first frequency spectrum that is substantially stationary relative to the data frequency spectrum, and a second idle signal, having a second frequency spectrum that is substantially non-stationary relative to the data frequency spectrum.

2. A method according to claim 1, wherein transmitting the first and second idle signals comprises controlling the alternation so that a combined spectrum of the signals transmitted during the idle interval is non-stationary relative to the data frequency spectrum to within an allowed limit of non-stationarity.

3. A method according to claim 1, wherein the second idle signal is chosen so as to have a substantially lower power consumption characteristic than the first idle signal.

4. A method according to claim 3, wherein the data and idle signals comprise multiple tones, and wherein the second idle signal comprises a substantially reduced number of tones relative to the first idle signal.

5. A method according to claim 4, wherein the second idle signal consists of a pilot tone.

6. A method according to claim 4, wherein the first idle signal consists of substantially the same tones as the data signal.

7. A method according to claim 3, wherein the power characteristic comprises a peak-to-average ratio (PAR).

8. A method according to claim 1, wherein the first idle signal is chosen to have statistical characteristics substantially similar to the statistical characteristics of the data signal.

9. A method according to claim 8, wherein the statistical characteristics and spectral characteristics of the first idle signal are substantially indistinguishable to a receiver of the idle and data signals from the statistical characteristics and spectral characteristics of the data signal.

10. A method according to claim 8, wherein the first idle signal comprises a random signal.

11. A method according to claim 1, wherein transmitting the idle signals comprises setting a duty cycle for alternation between the first and second idle signals, and transmitting the signals in accordance with the set duty cycle.

12. A method according to claim 11, wherein setting the duty cycle comprises controlling the duty cycle so that a combined spectrum of the signals transmitted during the idle interval has a selected degree of non-stationary relative to the data frequency spectrum.

13. A method according to claim 11, wherein setting the duty cycle comprises controlling the duty cycle so that the signals transmitted during the idle interval, taken together, have a selected level of average power.

14. A method according to claim 1, wherein transmitting the idle signals comprises intermittently altering a phase of at least one of the first and second idle signals, whereby a spectrum of the signals is flattened, and a bias on at least certain tones of the idle signals is eliminated.

15. A method according to claim 14, wherein intermittently altering the phase comprises shifting the phase at random by multiples of 90 degrees.

16. A method according to claim 1, wherein the first and second idle signals are respectively based on first and second nominal sequences of varying complex values.

17. A method according to claim 16, wherein the first and second nominal sequences are substantially identical.

18. Apparatus for transmission of high-speed digital signals, comprising:

a data encoder, which is adapted to receive input data and to generate a stream of data symbols responsive to the input data and further to generate in alternation, during an idle interval in the input data, first and second sequences of idle symbols;

a shaping filter, coupled to receive the stream of data symbols from the signal generator and to generate, responsive thereto, a data signal having a data frequency spectrum, and to receive the first and second sequences of idle symbols and to generate, responsive respectively thereto, a first idle signal, having a first frequency spectrum that is substantially stationary relative to the data frequency spectrum, and a second idle signal, having a second frequency spectrum that is substantially non-stationary relative to the data frequency spectrum; and a line driver, coupled to receive the data signal and the idle signals from the shaping filter and to transmit the signals over a line to a receiver.

19. Apparatus according to claim 18, wherein the data encoder is adapted to control the alternation so that a combined spectrum of the signals transmitted during the idle interval is non-stationary relative to the data frequency spectrum to within an allowed limit of non-stationarity.

20. Apparatus according to claim 18, wherein the second sequence of idle symbols is chosen so that the second idle signal has a substantially lower power consumption characteristic than the first idle signal.

21. Apparatus according to claim 20, wherein the data and idle signals comprise multiple tones, and wherein the second idle signal comprises a substantially reduced number of tones relative to the first idle signal.

22. Apparatus according to claim 21, wherein the second idle signal consists of a pilot tone.

23. Apparatus according to claim 21, wherein the first idle signal consists of substantially the same tones as the data signal.

24. Apparatus according to claim 20, wherein the power characteristic comprises a peak-to-average ratio (PAR).

25. Apparatus according to claim 18, wherein the first sequence of idle symbols is chosen so that the first idle signal has statistical characteristics substantially similar to the statistical characteristics of the data signal.

26. Apparatus according to claim 25, wherein the statistical characteristics and spectral characteristics of the first idle signal are substantially indistinguishable to a receiver of the idle an data signals from the statistical characteristics and spectral characteristics of the data signal.

27. Apparatus according to claim 25, wherein the first sequence of idle symbols comprises a random sequence.

28. Apparatus according to claim 18, wherein the data encoder is adapted to apply a predetermined duty cycle for alternation between the first and second sequences.

29. Apparatus according to claim 28, wherein the duty cycle is selected so that a combined spectrum of the signals transmitted during the idle interval has a selected degree of non-stationarity relative to the data frequency spectrum.

30. Apparatus according to claim 28, wherein the duty cycle is controlled so that the signals transmitted during the idle interval, taken together, have a selected level of average power.

31. Apparatus according to claim 18, wherein the data encoder is adapted to intermittently alter a phase of the idle symbols in at least one of the first and second sequence, whereby a spectrum of the idle signals is flattened, and a bias on at least certain tones of the idle signals is eliminated.

32. Apparatus according to claim 31, wherein the data encoder is adapted to alter the phase at random by multiples of 90 degrees.

33. Apparatus according to claim 18, wherein the first and second sequences are respectively based on first and second nominal sequences of varying complex values.

34. Apparatus according to claim 33, wherein the first and second nominal sequences are substantially identical.

* * * * *